United States Patent
Cai et al.

(10) Patent No.: US 12,529,105 B2
(45) Date of Patent: Jan. 20, 2026

(54) APPLICATION OF BAZ2B GENE AS TARGET IN SLOWING AGING

(71) Applicant: Center for Excellence in Brain Science and Intelligence Technology, Chinese Academy of Sciences, Shanghai (CN)

(72) Inventors: Shiqing Cai, Shanghai (CN); Jie Yuan, Shanghai (CN); Siyuan Chang, Shanghai (CN); Zhiyang Liu, Shanghai (CN)

(73) Assignee: Center for Excellence in Brain Science and Intelligence Technology, Chinese Academy of Sciences, Shanghai (CN)

( * ) Notice: Subject to any disclaimer, the term of this patent is extended or adjusted under 35 U.S.C. 154(b) by 1178 days.

(21) Appl. No.: 17/417,946

(22) PCT Filed: Dec. 27, 2019

(86) PCT No.: PCT/CN2019/129018
§ 371 (c)(1),
(2) Date: Jun. 24, 2021

(87) PCT Pub. No.: WO2020/155977
PCT Pub. Date: Aug. 6, 2020

(65) Prior Publication Data
US 2022/0073990 A1 Mar. 10, 2022

(30) Foreign Application Priority Data
Jan. 31, 2019 (CN) .......................... 201910097509.5

(51) Int. Cl.
| | |
|---|---|
| *C07H 21/02* | (2006.01) |
| *A61P 25/28* | (2006.01) |
| *C07H 21/04* | (2006.01) |
| *C12N 15/11* | (2006.01) |
| *C12N 15/113* | (2010.01) |
| *C12Q 1/6883* | (2018.01) |
| *G01N 33/68* | (2006.01) |

(52) U.S. Cl.
CPC ............ *C12Q 1/6883* (2013.01); *A61P 25/28* (2018.01); *C12N 15/11* (2013.01); *C12N 15/113* (2013.01); *G01N 33/6896* (2013.01); *C12N 2310/20* (2017.05); *C12Q 2600/158* (2013.01); *G01N 2800/28* (2013.01); *G01N 2800/2814* (2013.01)

(58) Field of Classification Search
CPC .......................... C12N 15/113; C12N 2310/14
See application file for complete search history.

(56) References Cited

U.S. PATENT DOCUMENTS

2017/0107218 A1   4/2017 Zhou et al.

FOREIGN PATENT DOCUMENTS

| CN | 105506065 A | 4/2016 | |
|---|---|---|---|
| EP | 2633050 B1 * | 10/2011 | ......... A61K 39/3955 |
| EP | 2924125 B1 | 6/2017 | |
| WO | 2007002528 A1 | 1/2007 | |
| WO | 2013105022 A2 | 7/2013 | |
| WO | 2014075083 A1 | 5/2014 | |

OTHER PUBLICATIONS

Chen et al. (J. Med. Chem. 2016, 59, 1410-1424).*
Zaware et al. (Current Opinion in Chemical Biology 2017, 39:116-125).*
Sep. 19, 2023 (EP) Extended European Search Report Application No. 19912684.8.
Loeser et al. Aging and osteoarthritis: the role of chondrocyte senescence and aging changes in the cartilage matrix. Osteoarthritis and Cartilage (2009) 17, 971-979.
Jones et al. A Novel Family of Bromodomain Genes. Genomics 63, 40-45 (2000).
Chen et al. "Discovery and Characterization of GSK2801, a Selective Chemical Probe for the Bromodomains BAZ2A and BAZ2B" J. Med. Chem. 2016, 59, 1410?1424.
Jian et al. "Changes of Expression Profile Induced by NGX6 Transfection in Nasopharyngeal Carcinoma Cells". Chinese Journal of Biochemistry and Molecular Biology, vol. 18, No. 4, Aug. 31, 2002.
Mar. 26, 2020 (WO) International Search Report, English Translation. PCT/CN2019/129018.
Vedove et al. "Structural Analysis of Small Molecule Binding to the BAZ2A and BAZ2B Bromodomains" ChemMedChem., vol. 13, No. 14, Jun. 21, 2018.
Amato et al. "Targeting Ligandable Pockets on Plant Homeodomain (PHD) Zinc Finger Domains by a Fragment-Based Approach"ACS Chem. Biol. 2018, 13, 915?921.
Yuan, J., Chang, SY., Yin, SG et al. Two conserved epigenetic regulators prevent healthy ageing. Nature 579, 118-122 (2020).
Fujisawa, T., Filippakopoulos, P. Functions of bromodomain-containing proteins and their roles in homeostasis and cancer. Nat Rev Mol Cell Biol 18, 246-262 (2017).

* cited by examiner

*Primary Examiner* — Amy Rose Hudson
(74) *Attorney, Agent, or Firm* — Banner & Witcoff, Ltd.

(57) ABSTRACT

Provided is an application of a BAZ2B gene as a target in slowing aging. It is disclosed that the BAZ2B gene plays an important regulatory role in occurrence and development of normal aging and age-related diseases, and the down-regulation thereof can significantly slow aging and alleviate-memory decay, capacity degradation and the like in the aging process. The BAZ2B can be used as the research target of aging and age-related diseases for developing drugs of inhibiting or delaying aging, and used as a diagnostic and prognostic marker of aging and age-related diseases.

3 Claims, 3 Drawing Sheets

Specification includes a Sequence Listing.

APPLICATION OF BAZ2B GENE AS TARGET IN SLOWING AGING

RELATED APPLICATIONS

This application is a National Stage Application under 35 U.S.C. 371 of co-pending PCT application PCT/CN2019/129018 designating the United States and filed Dec. 27, 2019; which claims the benefit of CN application No. 201910097509.5 and filed Jan. 31, 2019, each of which are hereby incorporated by reference in their entireties.

FIELD OF DISCLOSURE

The present disclosure belongs to the field of biomedicine. More specifically, the present disclosure relates to the application of BAZ2B gene as a target in alleviating aging.

BACKGROUND OF DISCLOSURE

The aging of population is becoming more and more serious. A report of the World Health Organization shows that by 2050, one third of the population in developing countries will be over 60 years old. During the aging process, various physiological functions of the organism gradually decrease, such as the decline of cognitive ability and exercise ability, sleep and rhythm disorders, etc. (Bishop et al., 2010; Satoh et al., 2017), which seriously affects the elderly people's quality of life, and also brings a serious burden to society. In addition, aging is the most important risk factor for the occurrence of neurodegenerative diseases such as Alzheimer's disease (Lopez-Otin et al., 2013). Therefore, it is very urgent to study the mechanism of behavior deterioration in the normal aging process and to find ways to alleviate aging and related functional degradation.

The results of whole genome expression studies reveal that the expression levels of many genes change significantly during the aging process of the brain. The genes with up-regulated expression are mainly those involved in functions such as stress response, antioxidant ability and DNA repair; these down-regulated genes mainly regulate synaptic plasticity, vesicle transport and mitochondrial function (Lu et al., 2004). Such gene expression changes during aging are very conservative in various species (Bishop et al., 2010; Yeoman et al., 2012), and they may be the underlying reasons for deterioration of biological behavior and cognitive function during aging. However, the regulatory mechanism of these gene expression changes during aging is far from clear.

Environmental factors greatly affect the normal and pathological brain aging process. Epigenetic regulatory factors link the environmental factors with cell signaling pathways. Many studies have found that epigenetic molecules can regulate the lifespan of nematodes, fruit flies and other model animals (Dang et al., 2014; Greer et al., 2010; Imai and Guarente, 2014; Jin et al., 2011; Sen et al., 2016). In the aging process, obvious changes occur in epigenetic modifications including DNA methylation and histone modification (Akbarian et al., 2013; Delgado-Morales and Esteller, 2017). Changes in gene expression in the brain aging process may be caused by changes in epigenetic modifications, but its specific regulatory mechanism and how the expression changes of these genes lead to behavioral deterioration are not clear.

In summary, there is an urgent need in this field to identify genes that are closely related to the aging mechanism, which are useful targets for finding medicaments that alleviate aging.

SUMMARY OF DISCLOSURE

The present disclosure is to provide the use of BAZ2B gene as a target in alleviating aging.

The first aspect of the present disclosure provides a use of a down-regulator of the BAZ2B protein or encoding gene thereof in manufacture of a composition for alleviating aging, or preventing or treating an aging-related disease.

In preferable embodiments, the down-regulator is selected from the group consisting of:
- a gene editing reagent that specifically knocks out the encoding gene of BAZ2B;
- an interfering molecule that specifically interferes with the expression of the encoding gene of BAZ2B;
- a small-molecule compound that specifically inhibits BAZ2B protein or encoding gene thereof; or
- an antibody or ligand that specifically binds to BAZ2B protein.

In preferable embodiments, the down-regulator is a gene editing reagent that specifically knocks out the encoding gene of BAZ2B, said gene editing reagent recognizes the encoding gene of BAZ2B and knocks out the gene; or is a construct capable of expressing or forming said gene editing reagent; preferably, the gene editing reagent includes a sgRNA selected from the group consisting of: SEQ ID NO:1, SEQ ID NO:2.

In other preferable embodiments, the interfering molecule is a small interfering RNA, antisense nucleic acid, microRNA, dsRNA, which inhibits or silences the encoding gene of BAZ2B or transcript thereof, or a construct capable of expressing or forming the small interfering RNA, antisense nucleic acid, microRNA, dsRNA; preferably, the interfering molecule is a shRNA, comprising the sequence of SEQ ID NO:3.

In other preferable embodiments, the aging-related disease comprises: memory decline, cognitive decline, behavioral decline, age-dependent weight gain, mitochondrial dysfunction, neurodegenerative diseases (especially aging-related neurodegenerative diseases); preferably, the neurodegenerative diseases comprise: Alzheimer's disease (AD).

In other preferable embodiments, the composition is also used in: increasing the expression of mitochondrial-function-related gene; increasing the ATP level of a neuron; increasing the basic oxygen respiration of a cell; increasing the FCCP-induced maximum oxygen respiration value of a cell.

Another aspect of the present disclosure provides a method for screening potential substances for alleviating aging, or preventing or treating an aging-related disease, the method comprising: (1) treating a system containing BAZ2B protein or encoding gene thereof with a candidate substance; and (2) detecting the expression or activity of BAZ2B protein or encoding gene thereof in the system (including but not limited to the expression and activity of BAZ2B protein, the transcription and translation of the encoding gene of BAZ2B); wherein, the candidate substance being capable of reducing the expression or activity of BAZ2B protein or encoding gene thereof indicates that the candidate substance is a potential substance for alleviating aging, or preventing or treating an aging-related disease.

In preferable embodiments, step (1) comprises: in the test group, adding the candidate substance to the system containing BAZ2B protein or encoding gene thereof; step (2) comprises: detecting the expression or activity of BAZ2B protein or encoding gene thereof in the system of the test group, and comparing it with the control group which is a system that expresses BAZ2B protein or encoding gene thereof and does not contain the candidate substance; the expression or activity of BAZ2B protein or encoding gene thereof in the test group being statistically lower than the control group indicates that the candidate is a potential substance for alleviating aging.

In other preferable embodiments, the system is selected from: a cell system (such as a cell or cell culture expressing BAZ2B), a subcellular system, a solution system, a tissue system, an organ system, or an animal system.

In another preferable example, the statistically lower is preferably significantly lower, such as lower than 20%; preferably lower than 50%; more preferably lower than 80%.

In other preferable embodiments, the candidate substance comprises (but is not limited to): a small-molecule compound designed for BAZ2B protein or encoding gene thereof, and an interference molecule, a nucleic acid inhibitor, a binding molecule (such as an antibody or ligand) designed for a signaling pathway involved in BAZ2B protein or encoding gene thereof, or upstream or downstream protein thereof.

In other preferable embodiments, the method further comprises: performing a cell experiment and/or animal experiment on the obtained potential substances to further select and determine a substance useful for alleviating aging, or preventing or treating an aging-related disease from the candidate substances.

Another aspect of the present disclosure provides a pharmaceutical composition for alleviating aging, or preventing or treating an aging-related disease, wherein the pharmaceutical composition comprises: a down-regulator of BAZ2B protein or encoding gene thereof, and a pharmaceutically acceptable carrier.

In preferable embodiments, the down-regulator is a gene editing reagent that specifically knocks out the coding gene of BAZ2B, said gene editing reagent recognizes the coding gene of BAZ2B and knocks out the gene, or is a construct capable of expressing or forming said gene editing reagent; preferably, the gene editing reagent includes a sgRNA selected from the group consisting of: SEQ ID NO: 1, SEQ ID NO:2; or the down-regulator is an interfering molecule shRNA comprising the sequence of SEQ ID NO:3.

Another aspect of the present disclosure provides a kit for alleviating aging, or preventing or treating an aging-related disease, wherein the kit comprises the pharmaceutical composition.

Another aspect of the present disclosure provides the use of a reagent that specifically recognizes BAZ2B protein or encoding gene thereof in manufacture of an agent or kit for the diagnosis or prognosis of aging or an aging-related disease.

In preferable embodiments, the reagent that specifically recognizes BAZ2B protein or encoding gene thereof is selected from the group consisting of: a primer that specifically amplify the encoding gene of BAZ2B protein; a probe that specifically recognize the encoding gene of BAZ2B protein; or an antibody or ligand that specifically binds to BAZ2B protein.

Other aspects of the disclosure will be apparent to those skilled in the art based on the disclosure herein.

A. The expression of BAZ2B gradually increases during aging. The data of the left panel come from the human brain gene expression database GSE1572, and the data of the right panel come from the database GSE44772.

B. Compared with normal elderly people of the same age, the expression of BAZ2B in the prefrontal cortex of AD patients is significantly increased. The data come from the database GSE5281.

C and D. BAZ2B expression is significantly positively correlated with the progression of late-onset AD disease (such as Braakst stage) and the degree of frontal atrophy. Significance is expressed as *** $P<0.001$ (unpaired Student's t-test).

Figure 2:
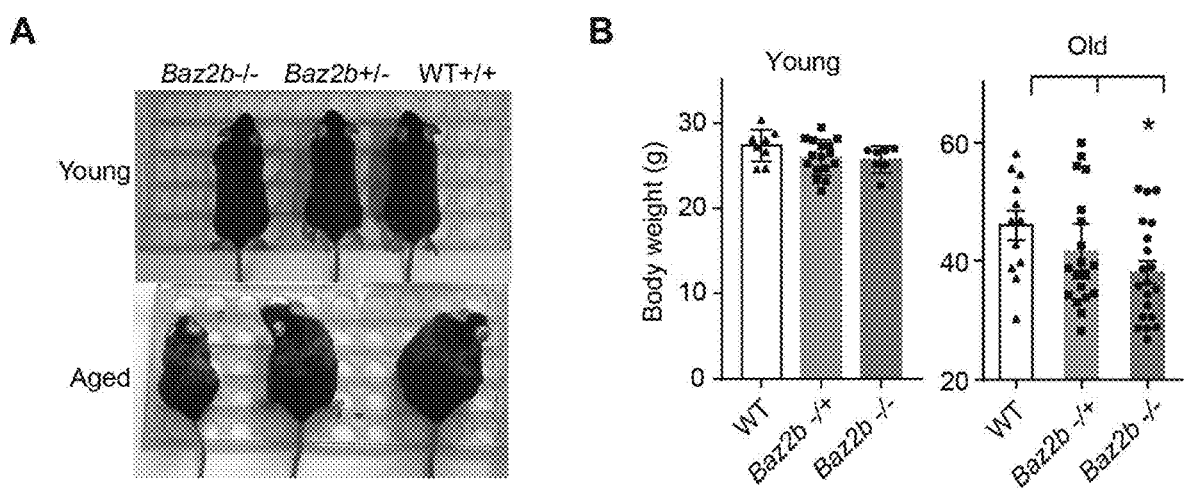

FIG. 2. Baz2b knockout can slow down the age-dependent weight gain of mice.

A. Typical pictures of Baz2b knockout heterozygous, Baz2b knockout homozygous and wild-type mice.

B, Statistical analysis of the body weight of Baz2b knockout heterozygous, Baz2b knockout homozygous and wild-type mice, young (about 2.5 months) and old (about 19 months). Significance is expressed as *$P<0.05$ (one-way ANOVA Dunnett's test).

Figure 3:
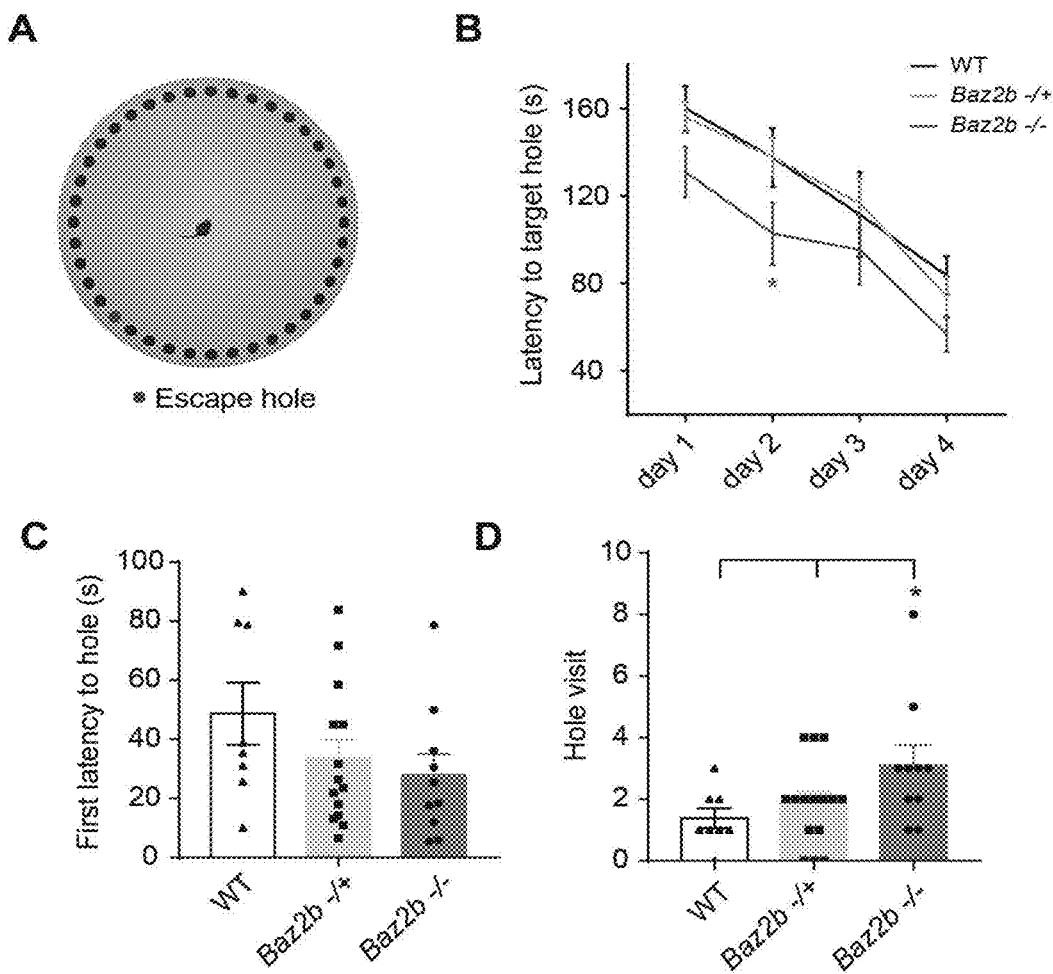

FIG. 3. Baz2b knockout can improve the spatial learning and memory ability of elderly mice.

A. Detection of the spatial learning and memory ability of elderly mice (18 to 24 months) by Barnes maze experiment. Red indicates the target hole.

B. Statistical analysis of the time required for mice of each genotype to find the target hole during consecutive 4-days of training.

C. Statistical analysis of the time required for mice of each genotype to find the target hole for the first time in the 5-day exploration experiment.

D. Statistical analysis of the number of times for mice of each genotype to explore the target hole in the 5-day exploration experiment. Significance is expressed as *$P<0.05$ (one-way ANOVA Dunnett's test).

Figure 4:
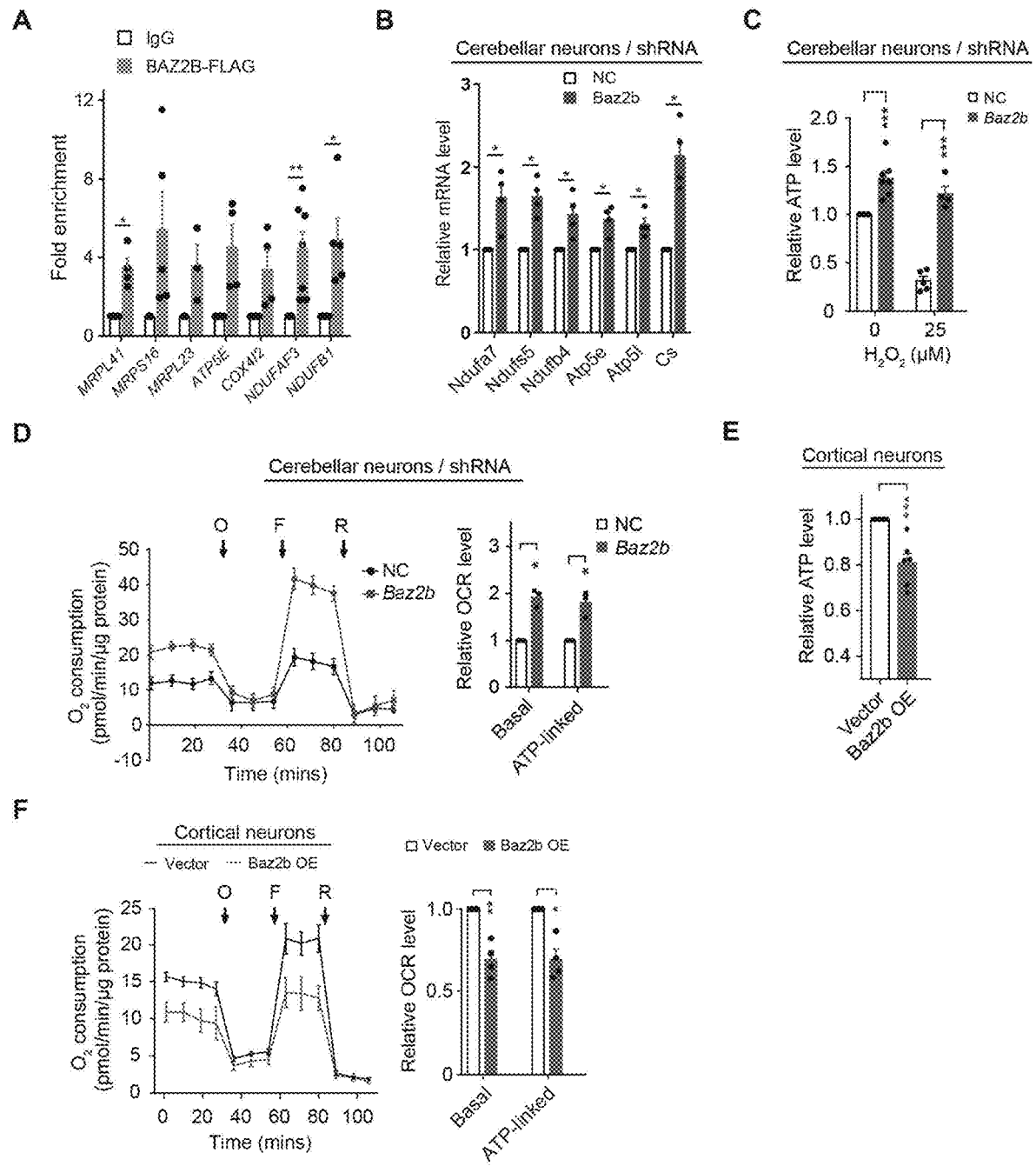

FIG. 4. Baz2b regulates the mitochondrial function of mouse neurons.

A, Chromatin immunoprecipitation quantitative PCR shows that Baz2b can bind to the promoter region of genes related to mitochondrial function. HEK293T cells overexpressing Baz2b-Flag are used in the experiment.

B. Decreasing the expression of Baz2b in mouse cerebellar neurons cultured in vitro can increase the expression level of genes related to mitochondrial function.

C. Decreasing the expression of Baz2b can increase the ATP level of mouse cerebellar neurons.

D. Decreasing the expression of Baz2b can increase the basal oxygen respiration and the FCCP-induced maximum oxygen respiration of mouse cerebellar neurons.

E. Overexpression of Baz2b in mouse cortical neurons cultured in vitro will reduce the ATP level of neurons.

F. Overexpression of Baz2b in mouse cortical neurons cultured in vitro will reduce the basal oxygen respiration and the FCCP-induced maximum oxygen respiration of neurons. Significance is expressed as *$P<0.05$,  $P<0.01$, * $P<0.001$ (Student's T tests).

DETAILED DESCRIPTION

After extensive and in-depth research, the inventors found that the Bromodomain adjacent to zinc finger domain protein 2B (BAZ2B) is important for regulating the occurrence and development of normal aging and aging-related diseases. Down-regulation of BAZ2B gene significantly alleviates aging, alleviates cognitive and behavior deterioration in the aging process. The BAZ2B can be used as the research target of aging and age-related diseases for developing drugs of inhibiting or delaying aging, and used as a diagnostic and prognostic marker of aging and age-related diseases.

BAZ2B Protein and Encoding Gene Thereof

The function of BAZ2B protein is currently unclear in the art. The BAZ2B protein contains a DNA binding domain, a PHD zinc finger domain, and a BROMO domain that can bind to acetylated histones. These domains suggest that BAZ2B plays an epigenetic regulatory role. Studies have reported that BAZ2B's homologous protein BAZ2A is a component of the chromatin remodeling complex, which can bind to DNA and inhibit transcription.

In the present disclosure, the term "BAZ2B protein" refers to a protein with the sequence shown in SEQ ID NO: 4 (human) or SEQ ID NO: 5 (mouse) (for their gene sequences, see GenBank NM_013450 (human), GenBank NM_001001182 (mouse)). The term also includes variations of the sequence having the same function as the BAZ2B protein. These variations include but are not limited to: deletion, insertion and/or substitution of several (usually 1-50, preferably 1-30, more preferably 1-20, most preferably 1-10, still more preferably 1-8, 1-5) amino acids, and addition or deletion of one or several (usually within 20, preferably within 10, more preferably within 5) amino acids at the C-terminal and/or N-terminal. For example, substitution with amino acids of comparable or similar properties usually does not change protein function in the art. As another example, addition or deletion of one or more amino acids to the C-terminus and/or N-terminus usually does not change the function of a protein either. The term also includes active fragments and active derivatives of the BAZ2B protein.

The polynucleotide sequence encoding the BAZ2B protein or its conservative variant (encoding sequence) can also be applied to the present disclosure. The term "encoding gene" can include a polynucleotide encoding the protein, or a polynucleotide that further includes additional coding and/or non-coding sequences. BAZ2B protein is highly conserved in mammals. Murine BAZ2B protein and human BAZ2B protein have high sequence identity.

By analyzing the database of expression level of human brain genes, the inventors found that the expression of BAZ2B gene in the anterior cortex of the brain gradually increases with aging. Further, by analyzing the gene expression in the prefrontal cortex of AD (Alzheimer's Disease) patients and normal elderly people of the same age, the inventors found that the expression of BAZ2B gene was further increased in AD patients; and there is a significant positive correlation between the expression of BAZ2B with the disease progression of late-onset AD (such as Braakst stage) and the degree of frontal atrophy. In aging process, the body weight of wild-type mice gradually increases with age. The body weight of old Baz2b knockout mice is significantly lower than that of wild-type mice, but the body weight of younger Baz2b knockout is similar with that of wild-type mice. In addition, knocking out Baz2b can significantly improve the spatial learning and memory ability of elderly mice. Mechanism studies have found that Baz2b can bind to the promoter regions of genes related to mitochondrial function and regulate the expression of these genes, thereby regulating the mitochondrial function of neurons. These results reveal that Baz2b plays an important role in normal and pathological brain aging. Baz2b can be used as a target to develop corresponding medicaments and methods to promote healthy aging of organisms.

BAZ2B Down-Regulator and Use Thereof

Based on the above findings, the present disclosure provides a use of a down-regulator of BAZ2B protein or its coding gene in manufacture of a composition for alleviating aging, or preventing and treating aging-related diseases. The aging-related diseases include but are not limited to: memory decline, cognitive decline, behavioral decline, age-dependent weight gain, mitochondrial dysfunction, neurodegenerative diseases (especially aging-related neurodegenerative diseases); diabetes and cancer, etc.

As used herein, the down-regulator of BAZ2B protein or encoding gene thereof includes an inhibitor, antagonist, retarder, blocker, etc., which can be used interchangeably.

The down-regulator of BAZ2B protein or encoding gene thereof refers to any substance that can reduce the activity of BAZ2B protein, reduce the stability of BAZ2B protein or encoding gene thereof, down-regulate the expression of BAZ2B protein, reduce the effective action period of BAZ2B protein, or inhibit transcription and translation of BAZ2B gene. These substances can be used in the present disclosure as substances useful for down-regulating BAZ2B. They can be used to promote healthy aging, or prevent or treat aging-related diseases. For example, the down-regulators are: interfering RNA molecules or antisense nucleotides that specifically interfere with the expression of BAZ2B gene; or antibodies or ligands that specifically bind to the protein encoded by BAZ2B gene, etc.

As an alternative embodiment of the present disclosure, the down-regulator is a small molecule compound targeting BAZ2B. Such small molecule compounds can be screened by those skilled in the art with conventional screening methods.

As an alternative embodiment of the present disclosure, the down-regulator is a BAZ2B-specific interfering RNA molecule (shRNA). Those skilled in the art can understand that such interfering RNA molecule can be prepared based on the sequence of BAZ2B gene provided in the present disclosure. The preparation method of the interfering RNA molecule is not limited, including but not limited to: chemical synthesis, transcription in vitro, etc. The interfering RNA molecule can be delivered into the cell by an appropriate transfection reagent, or through various techniques known in the art.

As preferable embodiments of the present disclosure, the CRISPR/Cas (such as Cas9) system can be used for targeted gene editing to knock out BAZ2B gene in the targeted disease region. Common methods for knocking out the BAZ2B gene include: co-transferring sgRNA or the nucleic acid capable of forming the sgRNA and Cas9 mRNA or the nucleic acid capable of forming the Cas9 mRNA into a targeted region or a targeted cell. Upon determining the targeted site, sgRNA and Cas9 can be introduced into the cell by any known method. The nucleic acid capable of forming the sgRNA is a nucleic acid construct or an expression vector, or the nucleic acid capable of forming the Cas9 mRNA is a nucleic acid construct or an expression vector. These expression vectors are introduced into the cell to produce active sgRNA and Cas9 mRNA in the cell. Preferably, the gene editing reagent is an sgRNA selected from the group consisting of: SEQ ID NO:1, and SEQ ID NO: 2. These sgRNAs present a good targeting ability and are verified by the Examples that they can significantly alleviate aging.

Use in the Diagnosis and Prognosis of Aging-Related Diseases

The present disclosure reveals that BAZ2B has an important function in regulating the occurrence and development of normal aging and AD diseases. For example, the Examples show that the expression of BAZ2B is significantly positively correlated with the progression of late-onset AD disease (such as Braakst stage) and the degree of frontal atrophy.

Based on the above findings, BAZ2B can be used as a marker for the diagnosis and prognosis of aging-related diseases: (i) classification, differential diagnosis, and/or susceptibility analysis of aging-related diseases; (ii) evaluation of a medication, medication efficacy, or prognosis of aging-related diseases of relevant populations, and selection of an appropriate treatment method. For example, population with abnormal BAZ2B gene expression can be identified for more special treatment.

The prognosis of an aging-related disease of a subject can be assessed by the expression or activity of BAZ2B in the sample of the subject, and appropriate medications can be selected for treatment. Generally, an expression threshold of BAZ2B can be specified, and a BAZ2B inhibition regimen is considered for a patient with the expression of BAZ2B higher than the threshold. The threshold can be readily determined by those skilled in the art. For example, the expression threshold of BAZ2B can be obtained by comparing the expression of BAZ2B in normal human cells or tissues with that in patient's cells or tissues.

Therefore, the present disclosure provides the use of BAZ2B protein or encoding gene thereof for the manufacture of an agent or kit for diagnosis or prognosis of aging and aging-related diseases.

Various techniques known in the art can be used to detect the presence and expression level of BAZ2B gene, and these techniques are all encompassed in the present disclosure. For example, techniques such as Southern blotting, Western blotting. DNA sequence analysis, or PCR can be used alone or in combination.

The disclosure also provides reagents for detecting the presence and expression level of BAZ2B protein or encoding gene thereof in an analyte. Preferably, to determine the presence of BAZ2B gene, primers that specifically amplify BAZ2B, or a probe that specifically recognizes BAZ2B can be used; to determine the expression of BAZ2B protein, an antibody or ligand that specifically binds to the protein encoded by BAZ2B can be used.

Those skilled in the art will understand the design process of a specific probe for BAZ2B gene. For example, a probe can be prepared that can specifically bind to a specific site on BAZ2B gene, but not specifically bind to a gene other than the BAZ2B gene. The probe can have a detectable signal.

The method for the detection of the expression of BAZ2B protein in the analyte by an antibody that specifically binds to BAZ2B protein is also well known to those skilled in the art.

The present disclosure also provides a kit for detecting the presence or expression level of BAZ2B gene in an analyte, wherein the kit comprises: a primer that specifically amplifies BAZ2B gene; a probe that specifically recognizes BAZ2B gene; or an antibody or ligand that specifically binds to the protein encoded by BAZ2B gene.

In addition, the kit can also include various reagents required for DNA extraction, PCR, hybridization, chromogenic reaction, etc., including but not limited to: extraction solution, amplification solution, hybridization solution, enzyme, control solution, chromogenic solution, washing solution, etc.

In addition, the kit also comprises instructions for use and/or nucleic acid sequence analysis software.

Drug Screening

Based on the close correlation between BAZ2B overexpression and aging and aging-related diseases, substances that inhibit the expression or activity of BAZ2B protein or encoding gene thereof can be screened. From such substances, useful drugs for alleviating aging, or preventing or treating aging-related diseases can be found.

Therefore, the present disclosure provides a method for screening potential substances for alleviating aging, or preventing or treating an aging-related disease, the method comprising: treating a system expressing BAZ2B with a candidate substance; and detecting the expression or activity of BAZ2B in the system; wherein, the candidate substance being capable of inhibiting the expression or activity of BAZ2B indicates that the candidate substance is a potential substance for alleviating aging, or preventing or treating an aging-related disease. The system expressing BAZ2B is preferably a cell (or cell culture) system, wherein the cell is one that endogenously expresses BAZ2B, or one that expresses recombinant BAZ2B.

In preferable embodiments of the present disclosure, a control group can be used in order to easily observe changes in the expression or activity of BAZ2B during screening.

In preferable embodiments, the method further includes: performing a cell experiment and/or animal experiment on the obtained potential substances to further select and determine a substance useful for alleviating aging, or preventing or treating an aging-related disease.

Another aspect of the present disclosure provides a potential substance capable of alleviating aging, or preventing or treating aging-related diseases obtained by the screening method. These preliminarily screened substances constitute a screening library, which can be used to further screening of a substance that inhibits the expression and activity of BAZ2B, and improves aging, or prevents or treats aging-related diseases.

Pharmaceutical Composition

The present disclosure also provides a pharmaceutical composition, which contains an effective amount (such as 0.000001-50 wt %; preferably 0.00001-20 wt %; more preferably, 0.0001-10 wt %) of the down-regulator of BAZ2B protein or encoding gene thereof, and a pharmaceutically acceptable carrier.

Preferable embodiments of the present disclosure provide a composition for alleviating aging or preventing or treating an aging-related disease, wherein the composition comprises: a down-regulator of BAZ2B protein or encoding gene thereof, and a pharmaceutically acceptable carrier. Preferably, the down-regulator is a gene editing reagent that specifically knocks out the coding gene of BAZ2B, said gene editing reagent recognizes the coding gene of BAZ2B and knocks out the gene; or is a construct capable of expressing or forming said gene editing reagent.

As used herein, the "effective amount" refers to an amount that can produce function or activity on humans and/or animals and can be accepted by the humans and/or animals. The "pharmaceutically acceptable carrier" refers to a carrier used for the administration of a therapeutic agent, and includes various excipients and diluents. The term refers to pharmaceutical carriers that are not essential active ingredients in themselves and do not cause excessive toxicity after administration. Suitable carriers are well known to those of ordinary skill in the art. The pharmaceutically acceptable carrier in the composition may contain liquid, such as water, saline, and buffer. In addition, these carriers may also contain auxiliary substances, such as fillers, lubricants, glidants, wetting agents or emulsifiers, pH buffer substances. The carriers may also contain a cell transfection reagent.

Based on the use of the down-regulator of BAZ2B protein or encoding gene thereof, methods well known in the art can be used to administer the down-regulator or encoding gene thereof, or pharmaceutical composition thereof to a mammal or human.

Preferably, gene therapy can be used. For example, the down-regulator of BAZ2B can be directly administered to the subject by methods such as injection; or, the expression unit (such as an expression vector or virus, or siRNA) harboring the down-regulator of BAZ2B can be delivered to the target site through certain route, and express the active down-regulator of BAZ2B. The administration process depends on the particular down-regulator being used, and is well-known to those skilled in the art.

The effective amount of the down-regulator of BAZ2B protein or encoding gene thereof of the present disclosure may vary based on the administration route and the severity of the disease to be treated. The preferable effective amount can be determined by a skilled in the art according to various factors (for example, through a clinical trial). The factors include, but are not limited to: the pharmacokinetic parameters (such as bioavailability, metabolism, or half-life) of the down-regulator of BAZ2B protein or encoding gene thereof; the severity of the disease to be treated of the patient, the weight of the patient, the immune status of the patient, the route of administration.

The present disclosure also provides a kit containing the pharmaceutical composition or directly containing the down-regulator of BAZ2B protein or encoding gene thereof. In addition, the kit may also include instructions explaining how to use the pharmaceuticals in the kit.

The disclosure is further illustrated by the specific examples described below. It should be understood that these examples are merely illustrative, and do not limit the scope of the present disclosure. The experimental methods without specifying the specific conditions in the following examples generally used the conventional conditions, such as those described in J. Sambrook, Molecular Cloning: A Laboratory Manual (3rd ed. Science Press, 2002) or followed the manufacturer's recommendation.

I. Materials and Methods

1. Construction of Baz2b knockout mice by CRISPR/Cas9

The mouse Baz2b gene has 14 transcripts, of which 4 transcripts encode proteins, comprising 2 long transcripts and 2 very short transcripts. The two long transcripts encode the same protein. sgRNAs were designed according to the exon where the start codon ATG is located:

```
sgRNA1:
                          (SEQ ID NO: 1)
ATCATCTTCTGCTCCTTCCGTGG;

sgRNA2:
                          (SEQ ID NO: 2)
AGATGATGTTGGTGTAGTGGAGG;
```

The above 2 sgRNAs were constructed into HP180 Cass9 plasmid, respectively. Then sgRNAs (2 were transcribed separately, 1:1 mixed) and cas9 mRNA were transcribed in vitro, and the products were injected into mouse fertilized eggs to obtain F0 generation mice. PCR was used to identify the genotypes of F0 generation mice, which were then crossed to obtain homozygous knock-out mice.

2. Chromatin Immunoprecipitation

HEK 293T cells stably expressing Baz2b:3FLAG were used for chromatin immunoprecipitation. HEK 293T cells overgrown in a 100 mm culture dish were fixed with 1% formaldehyde, and were lysed on ice by a lysis buffer of 10 mM Tris-HCl, pH 8.0, 200 mM NaCl, 1 mM EDTA, 0.5 mM EGTA, 0.1% Na-Deoxycholate, 0.5% N-lauroylsarcosine, 0.2% SDS and Protease inhibitor cocktail (Roche). Then the genomic DNA was broke by a bioruptor ultrasonic disruptor. Following ultrasound, the mixture was centrifuged and the supernatant was used for immunoprecipitation with anti-Flag (sigma F3165) antibody, IgG of the corresponding species, and protein A/G agarose beads. The DNA was digested and de-crosslinked by proteinase K, extracted and purified with ethanol for qPCR detection.

3. Mouse Primary Neuron Culture

The cortical neurons of C57 mice aged E13.5 were isolated. The mouse cortical tissue was dissected into 1×HBSS buffer (Thermo 14175095), and digested with 2 mg/ml Papain (Worthington LS003119) at 37° C. for 10 minutes. The digestion solution was removed and DMEM medium containing 10% fetal bovine serum and 1% P/S was added to terminate the digestion reaction. The tissue was gently aspirated into single cells with a pipette. Then the cell suspension was filtered through a 40 μm mesh sieve and centrifuged at 1000 rpm for 5 min. The cells were re-suspend in PM medium (Neurobasal, 2% B27 supplement, 1% Glutamax, 1% Penicillin-streptomycin, 5% FBS). After counting the cells, the required amount of cells were used for electroporation to introduce the corresponding expression plasmids. After nucleus transfection, cells were inoculated at an appropriate density in a culture plate with PDL and Laminin. After 24 hours, half of the medium was exchanged to serum-free medium (Neurobasal, 2% B27 Supplement, 1% Glutamax, 1% Penicillin-streptomycin).

4. ATP Detection

About $6 \times 10^5$ primary cultured mouse neurons were required for each detection of ATP level. Firstly, the adherent cells were washed once with 1×PBS, added with 300 μl of lysis buffer (10 mM Tris, 1 mM EDTA, 0.5% Triton-X100), and lysed on ice for 5 minutes. The mixture was aspirated evenly and transferred to a 1.5 ml EP tube. The tube was placed it at 4° C. to continue lysing for 10 minutes, and centrifuged at 2000 g for 10 minutes at 4° C. 75 μl supernatant was used detect protein concentration by BCA method. 40 μl supernatant was diluted 10-fold and used for ATP detection by CellTiter-Glo (Promega G7570) kit. The ratio of ATP content to protein content was used to analyze the ATP levels of cells in different treatment groups.

5. Mouse Behavior Experiment

Barnes maze experiment was used to detect the spatial learning and memory ability of elderly mice. The mice were about 24 months old, and mice of different genotypes were cultured in the same litter. First, the mice were trained to find the target hole for four consecutive days, 4 times a day with an interval of 15 minutes. On the fifth day, the ability to find the target hole was tested to show their spatial learning and memory ability. The time and the exploration number required for the mice to find the target hole for the first time was counted and analyzed. The behavioral experiment was a double-blind experiment and conforms to the experimental animal ethical requirement.

II. Example

Example 1. Expression of BAZ2B Gene

BAZ2B gene is widely expressed, such as bone marrow, lung, brain and other tissues. By analyzing the databases GSE1572 and GSE44772 of expression level of human brain genes, the inventors found that the expression of BAZ2B gene in the anterior cortex of the brain gradually increases with aging (FIG. 1A).

Figure 1:
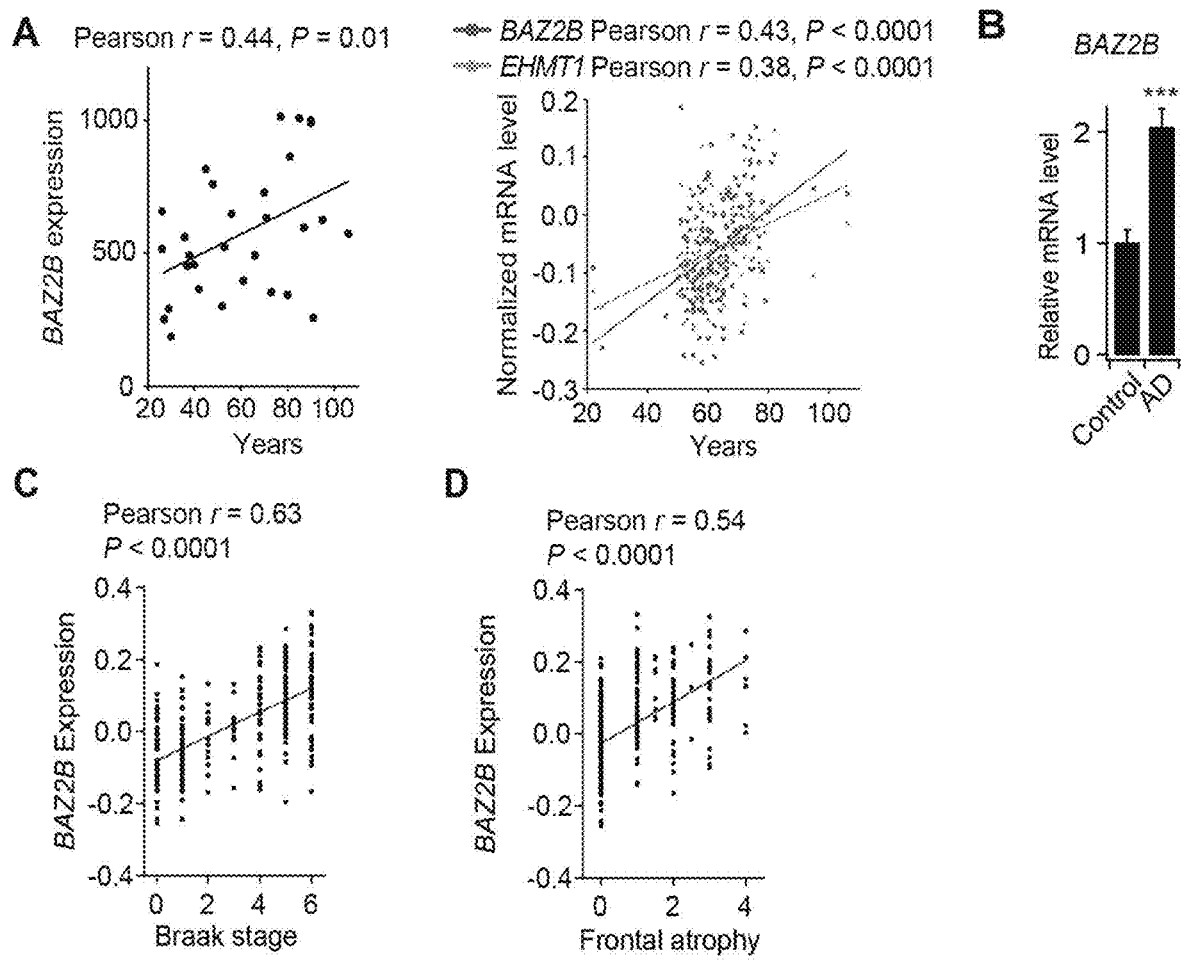
FIG. 1. Changes in the level of expression of BAZ2B during aging and its relationship with the progression of AD disease.

Further analysis of the gene expression database in the prefrontal cortex of AD patients and normal elderly people found that BAZ2B gene expression was significantly increased in AD patients compared to normal elderly people of the same age (FIG. 1B).

Analysis of the expression changes of BAZ2B gene during the progression of AD disease showed that BAZ2B expression is significantly positively correlated with the progression of late-onset AD disease (such as Braakst stage) and the degree of frontal atrophy (FIG. 1C, D).

These results suggest that BAZ2B plays an important role in regulating the occurrence and development of normal aging and AD diseases. Meanwhile, these results also indicate that BAZ2B can be used as a target for the diagnosis and prognosis of aging or aging-related diseases.

Example 2. Baz2b Knockout Improves the Learning Ability of Aging Animals

In order to study the regulatory role of Baz2b gene in aging in animals, the inventors constructed Baz2b knockout mice by CRISPR/Cas9 genome editing.

For behavioral analysis, Baz2b knockout heterozygous mice were bred to obtain littermates of Baz2b knockout heterozygous, homozygous and wild-type mice.

The performance of Baz2b knockout heterozygous, homozygous and wild-type mice during aging was analyzed. The results showed that wild-type mice present age-dependent weight gain. The body weight of younger Baz2b knockout heterozygous, homozygous and wild-type mice is not much different (FIG. 2A, B), but the body weight of elderly Baz2b knockout mice is significantly lower than that of elderly wild-type mice (FIG. 2A, B).

Barnes maze experiment was used to detect the spatial learning and memory ability of elderly mice. During 4 consecutive days of training, Baz2b knockout mice required less time to find the target hole than wild-type mice (FIG. 3A, B). In the exploration experiment on the 5th day, Baz2b knockout mice could find the target hole more quickly (FIG. 3C) and explore the target hole more frequently (FIG. 3D).

These results indicate that Baz2b gene knockout can improve the spatial learning and memory ability of elderly mice.

Example 3. Research on the Mechanism of Baz2b's Function of Improving Behavior Performance During Aging The mechanism of Baz2b's function of improving behavior performance during aging was studied.

Since Baz2b protein contains a DNA binding domain, chromatin immunoprecipitation quantitative PCR was used to identify genes bound by Baz2b protein. The results showed that Baz2b protein can bind to the promoter region of genes related to mitochondrial function (FIG. 4A).

Treating the primary neurons of the mouse cerebellum with shRNA (5'-GGCTCTTTCTCCAAGTTAA-3' (SEQ ID NO: 3)) showed that reducing the expression of Baz2b can increase the expression of genes related to mitochondrial function (FIG. 4B), thereby increasing the ATP levels of neurons (FIG. 4C), as well as the basal oxygen respiration and FCCP-induced maximum oxygen respiration of the cells (FIG. 4D).

Since the expression of Baz2b gradually increases during brain aging, Baz2b was overexpressed in the primary neurons of the mouse cortex by electroporation to simulate the aging process and explore the effects. The results show that Baz2b overexpression can significantly reduce the ATP levels of mouse cortical neurons and the oxygen respiration level of cells (FIG. 4E, F).

These results suggest that Baz2b protein regulates behavioral deterioration during aging by binding genes related to mitochondrial function, regulating expression of these genes, and then regulating the mitochondrial function of cells.

Example 4. Drug Screening

Group Setting:
Test group: cerebellar primary neuronal cells (in which Baz2b is endogenously expressed) treated with candidate substances;
Control group: cerebellar primary neuronal cells (in which Baz2b is endogenously expressed) without candidate substances treatment.

The expression of Baz2b in the test group and the control group were detected and compared. If the expression of Baz2b in the test group is statistically lower (such as lower than 30%) than the control group, it indicates that the candidate substance is a useful agent for alleviating aging or preventing and treating aging-related diseases.

Each reference provided herein is incorporated by reference to the same extent as if each reference was individually incorporated by reference. In addition, it should be understood that based on the above teaching content of the disclosure, those skilled in the art can practice various changes or modifications to the disclosure, and these equivalent forms also fall within the scope of the appended claims.

REFERENCES

Akbarian, S., Beeri, M. S., and Haroutunian, V. (2013). Epigenetic determinants of healthy and diseased brain aging and cognition. JAMA Neurol 70, 711-718.

Bishop, N. A., Lu, T., and Yankner, B. A. (2010). Neural mechanisms of ageing and cognitive decline. Nature 464, 529-535.

Dang, W., Sutphin, G. L., Dorsey, J. A., Otte, G. L., Cao, K., Perry, R. M., Wanat, J. J., Saviolaki, D., Murakami, C. J., Tsuchiyama, S., et al. (2014). Inactivation of yeast Isw2 chromatin remodeling enzyme mimics longevity effect of calorie restriction via induction of genotoxic stress response. Cell Metab 19, 952-966.

Delgado-Morales, R., and Esteller, M. (2017). Opening up the DNA methylome of dementia. Mol Psychiatr 22, 485-496.

Greer, E. L., Maures, T. J., Hauswirth, A. G., Green, E. M., Leeman, D. S., Maro, G. S., Han, S., Banko, M. R., Gozani, O., and Brunet, A. (2010). Members of the H3K4 trimethylation complex regulate lifespan in a germline-dependent manner in C. elegans. Nature 466, 383-387.

Imai, S., and Guarente, L. (2014). NAD+ and sirtuins in aging and disease. Trends Cell Biol 24, 464-471.

Jin, C., Li, J., Green, C. D., Yu, X., Tang, X., Han, D., Xian, B., Wang, D., Huang, X., Cao, X., et al. (2011). Histone demethylase UTX-1 regulates *C. elegans* life span by targeting the insulin/IGF-1 signaling pathway. Cell Metab 14, 161-172.

Lopez-Otin, C., Blasco, M. A., Partridge, L., Serrano, M., and Kroemer, G. (2013). The hallmarks of aging. Cell 153, 1194-1217.

Lu, T., Pan, Y., Kao, S. Y., Li, C., Kohane, I., Chan, J., and Yankner, B. A. (2004). Gene regulation and DNA damage in the ageing human brain. Nature 429, 883-891.

Satoh, A., Imai, S., and Guarente, L. (2017). The brain, sirtuins, and ageing. Nat Rev Neurosci 18, 362-374.

Sen, P., Shah, P. P., Nativio, R., and Berger, S. L. (2016). Epigenetic Mechanisms of Longevity and Aging. Cell 166, 822-839.

Yeoman, M., Scutt, G., and Faragher, R. (2012). Insights into CNS ageing from animal models of senescence. Nat Rev Neurosci 13, 435-445.

---

We claim:

1. A method for alleviating aging or treating an aging-related disease, comprising administering a down-regulator of BAZ2B protein or a gene encoding thereof to a subject in need thereof,
   wherein the down-regulator is
   a small interfering RNA, which inhibits or silences the gene encoding BAZ2B or the transcript thereof, or a construct capable of expressing or forming the small interfering RNA;
   wherein BAZ2B protein consists of the amino acid sequence of SEQ ID NO: 4 or SEQ ID NO: 5;
   wherein the aging-related disease is related to mitochondrial function of cortical neurons;
   wherein the aging-related disease is selected from the group consisting of: memory decline, cognitive decline, behavioral decline, age-dependent weight gain, mitochondrial dysfunction, and neurodegenerative diseases; and
   wherein the subject has BAZ2B protein overexpressed in anterior cortex of the brain.

2. The method according to claim 1, wherein the down-regulator is a shRNA comprising the sequence of SEQ ID NO: 3.

3. The method according to claim 1, wherein the aging-related disease is Alzheimer's disease.

* * * * *

SEQUENCE LISTING

```
<160> NUMBER OF SEQ ID NOS: 5

<210> SEQ ID NO 1
<211> LENGTH: 23
<212> TYPE: DNA
<213> ORGANISM: Artificial
<220> FEATURE:
<223> OTHER INFORMATION: single guide RNA (sgRNA)

<400> SEQUENCE: 1
atcatcttct gctccttccg tgg                                              23

<210> SEQ ID NO 2
<211> LENGTH: 23
<212> TYPE: DNA
<213> ORGANISM: Artificial
<220> FEATURE:
<223> OTHER INFORMATION: single guide RNA (sgRNA)

<400> SEQUENCE: 2
agatgatgtt ggtgtagtgg agg                                              23

<210> SEQ ID NO 3
<211> LENGTH: 19
<212> TYPE: DNA
<213> ORGANISM: Artificial
<220> FEATURE:
<223> OTHER INFORMATION: short hairpin RNA (shRNA)

<400> SEQUENCE: 3
ggctctttct ccaagttaa                                                   19

<210> SEQ ID NO 4
<211> LENGTH: 2168
<212> TYPE: PRT
<213> ORGANISM: Homo sapiens

<400> SEQUENCE: 4

Met Glu Ser Gly Glu Arg Leu Pro Ser Ser Ala Ala Ser Ser Thr Thr
1               5                   10                  15

Pro Thr Ser Ser Ser Thr Pro Ser Val Ala Ser Val Val Ser Lys Gly
                20                  25                  30

Gly Leu Ser Thr Gly Val Ala Ser Leu Ser Ser Thr Ile Asn Pro Cys
            35                  40                  45

Gly His Leu Phe Arg Thr Ala Gly Asp Gln Pro Phe Asn Leu Ser Thr
        50                  55                  60

Val Ser Ser Ala Phe Pro Met Val Ser His Pro Val Phe Gly Leu His
65                  70                  75                  80

Ser Ala Ser Ser Gly His Ser Glu Phe Gly Gly Leu Gly Thr Leu Gly
                85                  90                  95

Thr Pro Thr Ala Leu Ala Ala His Pro Gln Leu Ala Ser Phe Pro Gly
```

```
            100                 105                 110
Ala Glu Trp Trp Arg Thr Thr Asp Ala His Thr Arg Thr Gly Ala Thr
            115                 120                 125

Phe Phe Pro Pro Leu Leu Gly Ile Pro Pro Leu Phe Ala Pro Pro Ala
        130                 135                 140

Gln Asn His Asp Ser Ser Ser Phe His Ser Arg Thr Ser Gly Lys Ser
145                 150                 155                 160

Asn Arg Asn Gly Pro Glu Lys Gly Val Asn Gly Ser Ile Asn Gly Ser
                165                 170                 175

Asn Thr Ser Ser Val Ile Gly Ile Asn Thr Ser Val Leu Ser Thr Thr
            180                 185                 190

Ala Ser Ser Ser Met Gly Gln Thr Lys Ser Thr Ser Ser Gly Gly Gly
            195                 200                 205

Asn Arg Lys Cys Asn Gln Glu Gln Ser Lys Asn Gln Pro Leu Asp Ala
        210                 215                 220

Arg Val Asp Lys Ile Lys Asp Lys Lys Pro Arg Lys Lys Ala Met Glu
225                 230                 235                 240

Ser Ser Ser Asn Ser Asp Ser Asp Ser Gly Thr Ser Ser Asp Thr Ser
                245                 250                 255

Ser Glu Gly Ile Ser Ser Ser Asp Ser Asp Leu Glu Glu Asp Glu
            260                 265                 270

Glu Glu Glu Asp Gln Ser Ile Glu Glu Ser Glu Asp Asp Ser Asp
        275                 280                 285

Ser Glu Ser Glu Ala Gln His Lys Ser Asn Asn Gln Val Leu Leu His
    290                 295                 300

Gly Ile Ser Asp Pro Lys Ala Asp Gly Gln Lys Ala Thr Glu Lys Ala
305                 310                 315                 320

Gln Glu Lys Arg Ile His Gln Pro Leu Pro Leu Ala Ser Glu Ser Gln
                325                 330                 335

Thr His Ser Phe Gln Ser Gln Gln Lys Gln Pro Gln Val Leu Ser Gln
            340                 345                 350

Gln Leu Pro Phe Ile Phe Gln Ser Ser Gln Ala Lys Glu Glu Ser Val
        355                 360                 365

Asn Lys His Thr Ser Val Ile Gln Ser Thr Gly Leu Val Ser Asn Val
    370                 375                 380

Lys Pro Leu Ser Leu Val Asn Gln Ala Lys Lys Glu Thr Tyr Met Lys
385                 390                 395                 400

Leu Ile Val Pro Ser Pro Asp Val Leu Lys Ala Gly Asn Lys Asn Thr
                405                 410                 415

Ser Glu Glu Ser Ser Leu Leu Thr Ser Glu Leu Arg Ser Lys Arg Glu
            420                 425                 430

Gln Tyr Lys Gln Ala Phe Pro Ser Gln Leu Lys Lys Gln Glu Ser Ser
        435                 440                 445

Lys Ser Leu Lys Lys Val Ile Ala Ala Leu Ser Asn Pro Lys Ala Thr
    450                 455                 460

Ser Ser Ser Pro Ala His Pro Lys Gln Thr Leu Glu Asn Asn His Pro
465                 470                 475                 480

Asn Pro Phe Leu Thr Asn Ala Leu Leu Gly Asn His Gln Pro Asn Gly
                485                 490                 495

Val Ile Gln Ser Val Ile Gln Glu Ala Pro Leu Ala Leu Thr Thr Lys
            500                 505                 510

Thr Lys Met Gln Ser Lys Ile Asn Glu Asn Ile Ala Ala Ala Ser Ser
        515                 520                 525
```

```
Thr Pro Phe Ser Ser Pro Val Asn Leu Ser Thr Ser Gly Arg Arg Thr
    530                 535                 540
Pro Gly Asn Gln Thr Pro Val Met Pro Ser Ala Ser Pro Ile Leu His
545                 550                 555                 560
Ser Gln Gly Lys Glu Lys Ala Val Ser Asn Asn Val Asn Pro Val Lys
                565                 570                 575
Thr Gln His His Ser His Pro Ala Lys Ser Leu Val Glu Gln Phe Arg
            580                 585                 590
Gly Thr Asp Ser Asp Ile Pro Ser Ser Lys Asp Ser Glu Asp Ser Asn
        595                 600                 605
Glu Asp Glu Glu Glu Asp Glu Glu Glu Asp Glu Glu Glu Asp Asp Glu
    610                 615                 620
Asp Asp Glu Ser Asp Asp Ser Gln Ser Glu Ser Asp Ser Asn Ser Glu
625                 630                 635                 640
Ser Asp Thr Glu Gly Ser Glu Glu Asp Asp Asp Asp Lys Asp Gln
                645                 650                 655
Asp Glu Ser Asp Ser Asp Thr Glu Gly Glu Lys Thr Ser Met Lys Leu
                660                 665                 670
Asn Lys Thr Thr Ser Ser Val Lys Ser Pro Ser Met Ser Leu Thr Gly
            675                 680                 685
His Ser Thr Pro Arg Asn Leu His Ile Ala Lys Ala Pro Gly Ser Ala
        690                 695                 700
Pro Ala Ala Leu Cys Ser Glu Ser Gln Ser Pro Ala Phe Leu Gly Thr
705                 710                 715                 720
Ser Ser Ser Thr Leu Thr Ser Ser Pro His Ser Gly Thr Ser Lys Arg
                725                 730                 735
Arg Arg Val Thr Asp Glu Arg Glu Leu Arg Ile Pro Leu Glu Tyr Gly
                740                 745                 750
Trp Gln Arg Glu Thr Arg Ile Arg Asn Phe Gly Gly Arg Leu Gln Gly
            755                 760                 765
Glu Val Ala Tyr Tyr Ala Pro Cys Gly Lys Lys Leu Arg Gln Tyr Pro
        770                 775                 780
Glu Val Ile Lys Tyr Leu Ser Arg Asn Gly Ile Met Asp Ile Ser Arg
785                 790                 795                 800
Asp Asn Phe Ser Phe Ser Ala Lys Ile Arg Val Gly Asp Phe Tyr Glu
                805                 810                 815
Ala Arg Asp Gly Pro Gln Gly Met Gln Trp Cys Leu Leu Lys Glu Glu
                820                 825                 830
Asp Val Ile Pro Arg Ile Arg Ala Met Glu Gly Arg Arg Gly Arg Pro
            835                 840                 845
Pro Asn Pro Asp Arg Gln Arg Ala Arg Glu Glu Ser Arg Met Arg Arg
        850                 855                 860
Arg Lys Gly Arg Pro Pro Asn Val Gly Asn Ala Glu Phe Leu Asp Asn
865                 870                 875                 880
Ala Asp Ala Lys Leu Leu Arg Lys Leu Gln Ala Gln Glu Ile Ala Arg
                885                 890                 895
Gln Ala Ala Gln Ile Lys Leu Leu Arg Lys Leu Gln Lys Gln Glu Gln
            900                 905                 910
Ala Arg Val Ala Lys Glu Ala Lys Lys Gln Gln Ala Ile Met Ala Ala
        915                 920                 925
Glu Glu Lys Arg Lys Gln Lys Glu Gln Ile Lys Ile Met Lys Gln Gln
930                 935                 940
```

```
                                         -continued

Glu Lys Ile Lys Arg Ile Gln Gln Ile Arg Met Glu Lys Glu Leu Arg
945                 950                 955                 960

Ala Gln Gln Ile Leu Glu Ala Lys Lys Lys Lys Glu Glu Ala Ala
                965                 970                 975

Asn Ala Lys Leu Leu Glu Ala Glu Lys Arg Ile Lys Glu Lys Glu Met
                980                 985                 990

Arg Arg Gln Gln Ala Val Leu Leu Lys His Gln Glu Arg Glu Arg Arg
        995                 1000                1005

Arg Gln His Met Met Leu Met Lys Ala Met Glu Ala Arg Lys Lys
    1010                1015                1020

Ala Glu Glu Lys Glu Arg Leu Lys Gln Glu Lys Arg Asp Glu Lys
    1025                1030                1035

Arg Leu Asn Lys Glu Arg Lys Leu Glu Gln Arg Arg Leu Glu Leu
    1040                1045                1050

Glu Met Ala Lys Glu Leu Lys Lys Pro Asn Glu Asp Met Cys Leu
    1055                1060                1065

Ala Asp Gln Lys Pro Leu Pro Glu Leu Pro Arg Ile Pro Gly Leu
    1070                1075                1080

Val Leu Ser Gly Ser Thr Phe Ser Asp Cys Leu Met Val Val Gln
    1085                1090                1095

Phe Leu Arg Asn Phe Gly Lys Val Leu Gly Phe Asp Val Asn Ile
    1100                1105                1110

Asp Val Pro Asn Leu Ser Val Leu Gln Glu Gly Leu Leu Asn Ile
    1115                1120                1125

Gly Asp Ser Met Gly Glu Val Gln Asp Leu Leu Val Arg Leu Leu
    1130                1135                1140

Ser Ala Ala Val Cys Asp Pro Gly Leu Ile Thr Gly Tyr Lys Ala
    1145                1150                1155

Lys Thr Ala Leu Gly Glu His Leu Leu Asn Val Gly Val Asn Arg
    1160                1165                1170

Asp Asn Val Ser Glu Ile Leu Gln Ile Phe Met Glu Ala His Cys
    1175                1180                1185

Gly Gln Thr Glu Leu Thr Glu Ser Leu Lys Thr Lys Ala Phe Gln
    1190                1195                1200

Ala His Thr Pro Ala Gln Lys Ala Ser Val Leu Ala Phe Leu Ile
    1205                1210                1215

Asn Glu Leu Ala Cys Ser Lys Ser Val Val Ser Glu Ile Asp Lys
    1220                1225                1230

Asn Ile Asp Tyr Met Ser Asn Leu Arg Arg Asp Lys Trp Val Val
    1235                1240                1245

Glu Gly Lys Leu Arg Lys Leu Arg Ile Ile His Ala Lys Lys Thr
    1250                1255                1260

Gly Lys Arg Asp Thr Ser Gly Gly Ile Asp Leu Gly Glu Glu Gln
    1265                1270                1275

His Pro Leu Gly Thr Pro Thr Pro Gly Arg Lys Arg Arg Arg Lys
    1280                1285                1290

Gly Gly Asp Ser Asp Tyr Asp Asp Asp Asp Asp Asp Asp Ser Asp
    1295                1300                1305

Asp Gln Gly Asp Glu Asp Asp Glu Asp Glu Glu Asp Lys Glu Asp
    1310                1315                1320

Lys Lys Gly Lys Lys Thr Asp Ile Cys Glu Asp Glu Asp Glu Gly
    1325                1330                1335

Asp Gln Ala Ala Ser Val Glu Glu Leu Glu Lys Gln Ile Glu Lys
```

-continued

```
             1340                1345                1350
Leu Ser Lys Gln Gln Ser Gln Tyr Arg Arg Lys Leu Phe Asp Ala
        1355                1360                1365

Ser His Ser Leu Arg Ser Val Met Phe Gly Gln Asp Arg Tyr Arg
        1370                1375                1380

Arg Arg Tyr Trp Ile Leu Pro Gln Cys Gly Gly Ile Phe Val Glu
        1385                1390                1395

Gly Met Glu Ser Gly Glu Gly Leu Glu Glu Ile Ala Lys Glu Arg
        1400                1405                1410

Glu Lys Leu Lys Lys Ala Glu Ser Val Gln Ile Lys Glu Glu Met
        1415                1420                1425

Phe Glu Thr Ser Gly Asp Ser Leu Asn Cys Ser Asn Thr Asp His
        1430                1435                1440

Cys Glu Gln Lys Glu Asp Leu Lys Glu Lys Asp Asn Thr Asn Leu
        1445                1450                1455

Phe Leu Gln Lys Pro Gly Ser Phe Ser Lys Leu Ser Lys Leu Leu
        1460                1465                1470

Glu Val Ala Lys Met Pro Pro Glu Ser Glu Val Met Thr Pro Lys
        1475                1480                1485

Pro Asn Ala Gly Ala Asn Gly Cys Thr Leu Ser Tyr Gln Asn Ser
        1490                1495                1500

Gly Lys His Ser Leu Gly Ser Val Gln Ser Thr Ala Thr Gln Ser
        1505                1510                1515

Asn Val Glu Lys Ala Asp Ser Asn Asn Leu Phe Asn Thr Gly Ser
        1520                1525                1530

Ser Gly Pro Gly Lys Phe Tyr Ser Pro Leu Pro Asn Asp Gln Leu
        1535                1540                1545

Leu Lys Thr Leu Thr Glu Lys Asn Arg Gln Trp Phe Ser Leu Leu
        1550                1555                1560

Pro Arg Thr Pro Cys Asp Asp Thr Ser Leu Thr His Ala Asp Met
        1565                1570                1575

Ser Thr Ala Ser Leu Val Thr Pro Gln Ser Gln Pro Pro Ser Lys
        1580                1585                1590

Ser Pro Ser Pro Thr Pro Ala Pro Leu Gly Ser Ser Ala Gln Asn
        1595                1600                1605

Pro Val Gly Leu Asn Pro Phe Ala Leu Ser Pro Leu Gln Val Lys
        1610                1615                1620

Gly Gly Val Ser Met Met Gly Leu Gln Phe Cys Gly Trp Pro Thr
        1625                1630                1635

Gly Val Val Thr Ser Asn Ile Pro Phe Thr Ser Ser Val Pro Ser
        1640                1645                1650

Leu Gly Ser Gly Leu Gly Leu Ser Glu Gly Asn Gly Asn Ser Phe
        1655                1660                1665

Leu Thr Ser Asn Val Ala Ser Ser Lys Ser Glu Ser Pro Val Pro
        1670                1675                1680

Gln Asn Glu Lys Ala Thr Ser Ala Gln Pro Ala Ala Val Glu Val
        1685                1690                1695

Ala Lys Pro Val Asp Phe Pro Ser Pro Lys Pro Ile Pro Glu Glu
        1700                1705                1710

Met Gln Phe Gly Trp Trp Arg Ile Ile Asp Pro Glu Asp Leu Lys
        1715                1720                1725

Ala Leu Leu Lys Val Leu His Leu Arg Gly Ile Arg Glu Lys Ala
        1730                1735                1740
```

```
Leu Gln Lys Gln Ile Gln Lys His Leu Asp Tyr Ile Thr Gln Ala
    1745            1750                1755

Cys Leu Lys Asn Lys Asp Val Ala Ile Ile Glu Leu Asn Glu Asn
    1760            1765                1770

Glu Glu Asn Gln Val Thr Arg Asp Ile Val Glu Asn Trp Ser Val
    1775            1780                1785

Glu Glu Gln Ala Met Glu Met Asp Leu Ser Val Leu Gln Gln Val
    1790            1795                1800

Glu Asp Leu Glu Arg Arg Val Ala Ser Ala Ser Leu Gln Val Lys
    1805            1810                1815

Gly Trp Met Cys Pro Glu Pro Ala Ser Glu Arg Glu Asp Leu Val
    1820            1825                1830

Tyr Phe Glu His Lys Ser Phe Thr Lys Leu Cys Lys Glu His Asp
    1835            1840                1845

Gly Glu Phe Thr Gly Glu Asp Glu Ser Ser Ala His Ala Leu Glu
    1850            1855                1860

Arg Lys Ser Asp Asn Pro Leu Asp Ile Ala Val Thr Arg Leu Ala
    1865            1870                1875

Asp Leu Glu Arg Asn Ile Glu Arg Arg Ile Glu Glu Asp Ile Ala
    1880            1885                1890

Pro Gly Leu Arg Val Trp Arg Arg Ala Leu Ser Glu Ala Arg Ser
    1895            1900                1905

Ala Ala Gln Val Ala Leu Cys Ile Gln Gln Leu Gln Lys Ser Ile
    1910            1915                1920

Ala Trp Glu Lys Ser Ile Met Lys Val Tyr Cys Gln Ile Cys Arg
    1925            1930                1935

Lys Gly Asp Asn Glu Glu Leu Leu Leu Leu Cys Asp Gly Cys Asp
    1940            1945                1950

Lys Gly Cys His Thr Tyr Cys His Arg Pro Lys Ile Thr Thr Ile
    1955            1960                1965

Pro Asp Gly Asp Trp Phe Cys Pro Ala Cys Ile Ala Lys Ala Ser
    1970            1975                1980

Gly Gln Thr Leu Lys Ile Lys Lys Leu His Val Lys Gly Lys Lys
    1985            1990                1995

Thr Asn Glu Ser Lys Lys Gly Lys Lys Val Thr Leu Thr Gly Asp
    2000            2005                2010

Thr Glu Asp Glu Asp Ser Ala Ser Thr Ser Ser Leu Lys Arg
    2015            2020                2025

Gly Asn Lys Asp Leu Lys Lys Arg Lys Met Glu Glu Asn Thr Ser
    2030            2035                2040

Ile Asn Leu Ser Lys Gln Glu Ser Phe Thr Ser Val Lys Lys Pro
    2045            2050                2055

Lys Arg Asp Asp Ser Lys Asp Leu Ala Leu Cys Ser Met Ile Leu
    2060            2065                2070

Thr Glu Met Glu Thr His Glu Asp Ala Trp Pro Phe Leu Leu Pro
    2075            2080                2085

Val Asn Leu Lys Leu Val Pro Gly Tyr Lys Lys Val Ile Lys Lys
    2090            2095                2100

Pro Met Asp Phe Ser Thr Ile Arg Glu Lys Leu Ser Ser Gly Gln
    2105            2110                2115

Tyr Pro Asn Leu Glu Thr Phe Ala Leu Asp Val Arg Leu Val Phe
    2120            2125                2130
```

-continued

```
Asp Asn Cys Glu Thr Phe Asn  Glu Asp Asp Ser Asp  Ile Gly Arg
    2135                2140               2145

Ala Gly His Asn Met Arg Lys  Tyr Phe Glu Lys Lys   Trp Thr Asp
    2150                2155               2160

Thr Phe Lys Val Ser
    2165

<210> SEQ ID NO 5
<211> LENGTH: 2123
<212> TYPE: PRT
<213> ORGANISM: Mus musculus

<400> SEQUENCE: 5

Met Glu Ser Gly Glu Leu Leu Pro Ser Ser Pro Ala Ser Ser Thr Thr
1               5                   10                  15

Pro Thr Ser Ser Ser Ala Pro Ser Val Ala Ser Ala Val Ser Lys Ser
            20                  25                  30

Ser Leu Ser Thr Gly Ala Ala Ser Leu Ser Ser Thr Ala Ser Pro Cys
        35                  40                  45

Val Leu Glu Ala Gly Lys Ser Lys Ile Lys Val Ser Pro Asp Ser Val
    50                  55                  60

Ser Gly Ala Glu Trp Trp Arg Thr Thr Asp Gly His Ser Arg Ala Gly
65                  70                  75                  80

Thr Pro Phe Phe Pro Pro Leu Leu Gly Ile Pro Pro Leu Phe Ala Pro
                85                  90                  95

Pro Ala Gln Asn His Asp Ser Ser Phe His Ser Arg Thr Ser Gly Lys
            100                 105                 110

Ser Ser Arg Asn Gly Pro Glu Lys Gly Ile Asn Gly Ser Val Asn Gly
        115                 120                 125

Thr Ser Ala Ala Ser Val Leu Gly Val Asn Ala Ser Val Val Ala Thr
    130                 135                 140

Pro Ala Ser Ser Ser Met Gly Gln Asn Gln Ser Thr Ser Ser Gly Gly
145                 150                 155                 160

Gly Thr Leu Lys Cys His Gln Glu Gln Asn Lys Ser Gln Pro Val Asp
                165                 170                 175

Ala Arg Ala Asp Arg Ile Lys Asp Lys Lys Pro Arg Lys Lys Ala Met
            180                 185                 190

Glu Ser Ser Asn Ser Asp Ser Asp Ser Gly Thr Ser Ser Asp Thr
            195                 200                 205

Ser Ser Glu Gly Ile Ser Ser Asp Ser Asp Leu Glu Glu Glu
    210                 215                 220

Glu Glu Glu Asp Gln Ser Val Glu Glu Ser Asp Asp Asp Ser Asp
225                 230                 235                 240

Ser Glu Thr Glu Ala Gln His Lys Ser Asn Asn Gln Val Leu Leu His
            245                 250                 255

Gly Ile Ser Asp Pro Lys Thr Asp Gly Gln Lys Ala Thr Glu Lys Ala
            260                 265                 270

Gln Glu Arg Arg Thr His Gln Pro Leu Pro Pro Val Ser Glu Ser Gln
    275                 280                 285

Thr His Pro Pro Phe Gln Ser Gln Gln Lys Pro Gln Val Leu Ser
        290                 295                 300

Gln Gln Leu Pro Phe Ile Phe Gln Ser Ser Ala Lys Glu Glu Ser
305                 310                 315                 320

Val Thr Lys His Thr Ser Val Ile Gln Ser Thr Gly Leu Val Ser Asn
                325                 330                 335
```

```
Val Lys Pro Leu Ser Leu Val Asn Gln Ala Lys Lys Glu Thr Tyr Arg
            340                 345                 350

Lys Leu Val Val Pro Ser Pro Asp Val Leu Lys Ala Gly Asn Lys Asn
            355                 360                 365

Thr Ser Glu Glu Ser Ser Ser Leu Thr Ser Glu Leu Arg Ser Lys Arg
370                 375                 380

Glu Gln Tyr Lys Gln Thr Phe Pro Ser Gln Gly Lys Lys Gln Glu Met
385                 390                 395                 400

Gly Lys Ser Leu Lys Lys Val Ile Ala Ala Leu Ser Asn Thr Lys Ala
                405                 410                 415

Thr Ser Ser Ser Pro Ala His Pro Lys Leu Pro Leu Asp Asn Asn His
            420                 425                 430

Pro Asn Pro Phe Leu Thr Asn Ala Leu Leu Gly Asn His Gln Pro Asn
            435                 440                 445

Gly Val Ile Gln Ser Val Ile Gln Glu Ala Pro Leu Ala Leu Thr Thr
            450                 455                 460

Lys Thr Lys Met Gln Ser Lys Ile Asn Glu Asn Val Ser Ser Ser Thr
465                 470                 475                 480

Pro Phe Ser Ser Pro Val Asn Leu Ser Thr Ser Gly Arg Arg Ala Pro
                485                 490                 495

Gly Ser Gln Thr Pro Ala Leu Pro Ser Ala Ser Pro Ile Leu His Ser
            500                 505                 510

Ser Gly Lys Glu Lys Arg Val Ser Asn Asp Ala Thr Pro Leu Lys Ala
            515                 520                 525

His His His Pro His Pro Ala Ala Ala Ala Ala Leu Val Glu Gln
            530                 535                 540

Phe Arg Gly Thr Asp Ser Asp Val Pro Ser Ser Lys Asp Ser Glu Asp
545                 550                 555                 560

Ser Asn Glu Asp Glu Glu Asp Asp Glu Glu Asp Glu Asp
                565                 570                 575

Asp Glu Asp Asp Glu Ser Asp Ser Gln Ser Glu Ser Asp Ser Asn
                580                 585                 590

Ser Gln Ser Asp Ser Glu Gly Ser Glu Asp Glu Glu Lys Asp Gln
            595                 600                 605

Glu Glu Ser Asp Ser Asp Thr Glu Gly Glu Lys Pro Ala Val Asn Leu
            610                 615                 620

Thr Gln Thr Ser Ser Ser Ala Lys Ser Pro Pro Ser Ser Leu Thr Ala
625                 630                 635                 640

His Ser Ala Pro His Leu His Ile Gly Ser Pro Gly Ser Ala Pro
                645                 650                 655

Ala Ala Leu Cys Ser Glu Ser Gln Pro Pro Ala Phe Leu Gly Thr Ser
            660                 665                 670

Ser Ser Thr Leu Thr Ser Thr Pro His Ser Gly Thr Ser Lys Arg Arg
            675                 680                 685

Arg Val Ala Asp Asp Gln Glu Leu Arg Ile Pro Leu Asp Tyr Gly Trp
            690                 695                 700

Gln Arg Glu Thr Arg Val Arg Asn Phe Gly Gly Arg Leu Pro Gly Glu
705                 710                 715                 720

Val Ala Tyr Tyr Ala Pro Cys Gly Lys Lys Leu Arg Gln Cys Pro Asp
                725                 730                 735

Met Val Lys Gly Met Gln Trp Cys Leu Leu Lys Glu Glu Asp Val Ile
                740                 745                 750
```

```
Pro Arg Ile Arg Ala Met Asp Gly Arg Arg Gly Arg Pro Asn Pro
        755                 760                 765

Asp Arg Pro Arg Ala Arg Glu Glu Ser Arg Met Lys Arg Arg Lys Gly
770                 775                 780

Arg Pro Pro Asn Val Gly Ser Ala Glu Phe Leu Asp Asn Thr Asp Ala
785                 790                 795                 800

Lys Leu Leu Arg Lys Leu Gln Ala Gln Glu Ile Ala Arg Gln Ala Ala
                805                 810                 815

Gln Ile Lys Leu Leu Arg Lys Leu Gln Lys Gln Glu Gln Ala Arg Val
                820                 825                 830

Ala Lys Glu Ala Lys Lys Gln Gln Ala Ile Met Ala Ala Glu Glu Lys
                835                 840                 845

Arg Lys Gln Lys Glu Gln Met Lys Ile Ile Lys Gln Gln Glu Lys Ile
        850                 855                 860

Lys Arg Ile Gln Gln Ile Arg Met Glu Lys Glu Leu Arg Ala Gln Gln
865                 870                 875                 880

Ile Leu Glu Ala Lys Lys Lys Lys Glu Ala Ala Asn Ala Lys
                885                 890                 895

Leu Leu Glu Ala Glu Lys Arg Thr Lys Glu Lys Glu Leu Arg Arg Gln
        900                 905                 910

Gln Ala Val Leu Leu Lys His Gln Glu Arg Glu Arg Arg Gln His
        915                 920                 925

Val Met Leu Met Lys Ala Met Glu Ala Arg Lys Lys Ala Glu Glu Lys
        930                 935                 940

Glu Arg Leu Lys Gln Glu Lys Arg Asp Glu Lys Arg Leu Asn Lys Glu
945                 950                 955                 960

Arg Lys Leu Glu Gln Arg Arg Leu Glu Leu Glu Met Ala Lys Glu Leu
                965                 970                 975

Lys Lys Pro Lys Glu Asp Met Cys Leu Ala Asp Gln Lys Pro Leu Pro
                980                 985                 990

Glu Trp Pro Arg Ile Pro Gly Leu Val Leu Ser Gly Thr Thr Phe Ser
        995                 1000                1005

Asp Cys Leu Met Val Val Gln Phe Leu Arg Asn Phe Gly Lys Val
        1010                1015                1020

Leu Gly Phe Asp Val Asn Ile Asp Val Pro Asn Leu Ser Val Leu
        1025                1030                1035

Gln Glu Gly Leu Leu Asn Ile Gly Asp Ser Met Gly Glu Val Gln
        1040                1045                1050

Asp Leu Leu Val Arg Leu Leu Ser Ala Ala Val Cys Asp Pro Gly
        1055                1060                1065

Leu Ile Thr Gly Tyr Lys Ala Lys Thr Ala Leu Gly Glu His Leu
        1070                1075                1080

Leu Asn Val Gly Val Asn Arg Asp Asn Val Ser Glu Val Leu Gln
        1085                1090                1095

Ile Phe Met Glu Ala His Cys Gly Gln Thr Glu Leu Thr Glu Ser
        1100                1105                1110

Leu Lys Thr Lys Ala Phe Gln Ala His Thr Pro Ala Gln Lys Ala
        1115                1120                1125

Ser Ile Leu Ala Phe Leu Val Asn Glu Leu Ala Cys Ser Lys Ser
        1130                1135                1140

Val Val Ser Glu Ile Asp Lys Asn Ile Glu Tyr Met Ser Asn Leu
        1145                1150                1155

Arg Arg Asp Lys Trp Met Val Glu Gly Lys Leu Arg Lys Leu Arg
```

-continued

```
            1160                1165                1170

Ile  Ile  His  Ala  Lys  Lys  Thr  Gly  Lys  Arg  Asp  Ala  Ser  Gly  Gly
            1175                1180                1185

Ile  Asp  Leu  Gly  Glu  Glu  Gln  His  Pro  Leu  Gly  Thr  Pro  Thr  Pro
            1190                1195                1200

Gly  Arg  Lys  Arg  Arg  Arg  Lys  Gly  Gly  Asp  Ser  Asp  Tyr  Asp  Asp
            1205                1210                1215

Asp  Asp  Asp  Asp  Asp  Ser  Asp  Gln  Ala  Asp  Glu  Asp  Glu  Glu
            1220                1225                1230

Asp  Glu  Glu  Asp  Lys  Asp  Asp  Lys  Lys  Gly  Lys  Lys  Thr  Asp  Ile
            1235                1240                1245

Cys  Glu  Asp  Glu  Asp  Glu  Gly  Asp  Gln  Thr  Ala  Ser  Val  Glu  Glu
            1250                1255                1260

Leu  Glu  Lys  Gln  Ile  Glu  Lys  Leu  Ser  Lys  Gln  Gln  Ser  Gln  Tyr
            1265                1270                1275

Arg  Arg  Lys  Leu  Phe  Asp  Ala  Ser  His  Ser  Leu  Arg  Ser  Met  Met
            1280                1285                1290

Phe  Gly  Gln  Asp  Arg  Tyr  Arg  Arg  Tyr  Trp  Ile  Leu  Pro  Gln
            1295                1300                1305

Cys  Gly  Gly  Ile  Phe  Val  Glu  Gly  Met  Glu  Ser  Gly  Glu  Gly  Leu
            1310                1315                1320

Glu  Glu  Ile  Ala  Lys  Glu  Lys  Glu  Lys  Leu  Lys  Lys  Ala  Glu  Ser
            1325                1330                1335

Leu  Gln  Ile  Lys  Glu  Glu  Val  Phe  Glu  Thr  Ser  Ala  Glu  Thr  Leu
            1340                1345                1350

Asn  Cys  Ser  Ile  Arg  Asp  His  Cys  Glu  Gln  Lys  Asp  Asp  Pro  Lys
            1355                1360                1365

Glu  Lys  Asp  Asn  Thr  Asn  Leu  Phe  Leu  Gln  Lys  Pro  Gly  Ser  Phe
            1370                1375                1380

Ser  Lys  Leu  Ser  Lys  Leu  Leu  Glu  Val  Ala  Lys  Met  Pro  Pro  Glu
            1385                1390                1395

Ser  Asp  Val  Met  Thr  Pro  Pro  Lys  Val  Asn  Val  Ser  Thr  Asn  Gly
            1400                1405                1410

Gly  Pro  Leu  Ser  His  Gln  Asn  Ser  Gly  Lys  His  Pro  Leu  Gly  Ser
            1415                1420                1425

Val  Pro  Ser  Ala  Thr  Thr  Ala  Gln  Ser  Pro  Val  Gly  Lys  Thr  Asp
            1430                1435                1440

Ala  Ser  Leu  Phe  Ser  Ser  Gly  Ser  Gly  Ser  Cys  Gly  Lys  Phe  Tyr
            1445                1450                1455

Ser  Pro  Leu  Pro  Asn  Asp  Gln  Leu  Leu  Lys  Thr  Leu  Thr  Glu  Lys
            1460                1465                1470

Asn  Arg  Gln  Trp  Phe  Ser  Leu  Leu  Pro  Lys  Thr  Pro  Cys  Asp  Asp
            1475                1480                1485

Thr  Ser  Leu  Thr  His  Ala  Asp  Leu  Ser  Thr  Thr  Leu  Val  Thr  Pro
            1490                1495                1500

Gln  Ser  Gln  Pro  Pro  Ser  Lys  Ser  Pro  Ser  Pro  Ala  Pro  Ala  Ala
            1505                1510                1515

Leu  Leu  Gly  Pro  Ser  Ser  Val  Gln  Ser  Pro  Pro  Gly  Leu  Asn  Pro
            1520                1525                1530

Phe  Ala  Leu  Ser  Pro  Leu  Gln  Val  Lys  Gly  Gly  Val  Ser  Met  Met
            1535                1540                1545

Gly  Leu  Gln  Phe  Cys  Gly  Trp  Pro  Ala  Gly  Val  Leu  Ala  Ser  Asn
            1550                1555                1560
```

-continued

Val Pro Phe Thr Ser Pro Leu Pro Ala Leu Gly Ser Gly Leu Gly
1565                 1570                1575

Leu Pro Glu Gly Asn Gly Ser Ser Ser Phe Leu Thr Ser Ser Val
1580                 1585                1590

Ala Ser Ser Lys Ser Asp Ser Pro Val Pro Ala Glu Arg Pro
1595                 1600                1605

Ser Ser Ala Gln Pro Val Ala Val Glu Val Ala Lys Pro Val Asp
1610                 1615                1620

Phe Pro Ser Pro Lys Pro Ile Pro Glu Glu Met Gln Phe Gly Trp
1625                 1630                1635

Trp Arg Ile Ile Asp Pro Glu Asp Leu Lys Thr Leu Leu Lys Val
1640                 1645                1650

Leu His Leu Arg Gly Ile Arg Glu Lys Ala Leu Gln Lys Gln Ile
1655                 1660                1665

Gln Lys His Leu Asp Tyr Ile Thr Gln Ala Cys Val Arg Asn Lys
1670                 1675                1680

Asp Val Ala Ile Ile Glu Leu Asn Glu Asn Glu Asp Asn Gln Val
1685                 1690                1695

Thr Arg Asp Leu Val Glu Asn Trp Ser Val Glu Gln Ala Met
1700                 1705                1710

Glu Leu Asp Leu Ser Ile Leu Gln Gln Val Glu Asp Leu Glu Arg
1715                 1720                1725

Arg Val Ala Ser Ala Ser Leu Gln Val Lys Gly Trp Met Cys Pro
1730                 1735                1740

Glu Pro Ala Ser Glu Arg Glu Asp Leu Val Tyr Phe Glu His Lys
1745                 1750                1755

Ser Leu Thr Lys Leu Phe Lys Glu His Asp Gly Glu Leu Thr Gly
1760                 1765                1770

Asp Glu Glu Asn Ser Ala His Ala Leu Ala Arg Lys Ser Asp Asn
1775                 1780                1785

Pro Leu Asp Ile Ala Val Thr Arg Leu Ala Asp Leu Glu Arg Asn
1790                 1795                1800

Ile Glu Arg Arg Tyr Leu Lys Ser Pro Leu Ser Thr Thr Ile Gln
1805                 1810                1815

Ile Lys Leu Asp Asn Val Gly Thr Val Thr Val Pro Ala Pro Ala
1820                 1825                1830

Pro Ser Ile Ser Gly Asp Gly Asp Gly Ile Glu Glu Asp Ile Ala
1835                 1840                1845

Pro Gly Leu Arg Val Trp Arg Arg Ala Leu Ala Glu Ala Arg Ser
1850                 1855                1860

Ala Ala Gln Val Ala Leu Cys Ile Gln Gln Leu Gln Arg Ser Ile
1865                 1870                1875

Ala Trp Glu Lys Ser Ile Met Lys Val Tyr Cys Gln Ile Cys Arg
1880                 1885                1890

Lys Gly Asp Asn Glu Glu Leu Leu Leu Cys Asp Gly Cys Asp
1895                 1900                1905

Lys Gly Cys His Thr Tyr Cys His Arg Pro Lys Ile Thr Thr Ile
1910                 1915                1920

Pro Asp Gly Asp Trp Phe Cys Pro Ala Cys Ile Ser Lys Ala Ser
1925                 1930                1935

Gly Gln Ser Ile Lys Ile Lys Lys Ile His Val Lys Gly Lys Lys
1940                 1945                1950

```
Thr Asn Asp Ser Lys Lys Thr Lys Lys Gly Asn Val Ala Gly Asp
1955                1960                1965

Thr Glu Asp Glu Asp Ser Ala Ser Thr Ser Ser Ser Leu Lys Arg
1970                1975                1980

Gly Ser Lys Glu Leu Lys Lys Arg Lys Met Glu Glu Thr Thr Ser
1985                1990                1995

Leu Asn Leu Ser Lys Ala Glu Ser Thr Ser Ile Lys Lys Pro
2000                2005                2010

Lys Lys Asp Glu Ser Arg Asp Leu Ala Leu Cys Ser Met Ile Leu
2015                2020                2025

Thr Glu Met Glu Thr His Glu Asp Ser Trp Pro Phe Leu Leu Pro
2030                2035                2040

Val Asn Leu Lys Leu Val Pro Gly Tyr Lys Lys Val Ile Lys Lys
2045                2050                2055

Pro Met Asp Phe Ser Thr Ile Arg Glu Lys Leu Asn Asn Gly Gln
2060                2065                2070

Tyr Pro Asn Phe Glu Thr Phe Ala Leu Asp Val Arg Leu Val Phe
2075                2080                2085

Asp Asn Cys Glu Thr Phe Asn Glu Asp Asp Ser Asp Ile Gly Arg
2090                2095                2100

Ala Gly His Ser Met Arg Lys Tyr Phe Glu Lys Lys Trp Thr Asp
2105                2110                2115

Thr Phe Lys Val Ser
2120
```